(12) United States Patent  
Brown

(10) Patent No.: US 6,523,177 B1
(45) Date of Patent: Feb. 18, 2003

(54) CABLE TELEVISION SYSTEM WITH DIGITAL REVERSE PATH ARCHITECTURE

(75) Inventor: Douglas E. Brown, Lawrenceville, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 0 days.

(21) Appl. No.: 09/283,498

(22) Filed: Apr. 1, 1999

(51) Int. Cl.[7] .............. H04N 7/173; H04J 14/02; H04B 10/00
(52) U.S. Cl. .............. 725/121; 725/127; 725/129; 725/118; 725/119; 725/105; 359/125; 359/167
(58) Field of Search ............... 725/105, 114, 725/111, 117, 118, 119, 121, 127, 129; 359/125, 167

(56) References Cited

U.S. PATENT DOCUMENTS

| | | | |
|---|---|---|---|
| 3,995,120 A | | 11/1976 | Pachynski, Jr. |
| 4,759,018 A | | 7/1988 | Buchner |
| 4,994,909 A | * | 2/1991 | Graves et al. ............ 358/86 |
| 5,018,142 A | | 5/1991 | Simcoe et al. |
| 5,221,983 A | * | 6/1993 | Wagner ............ 359/125 |
| 5,420,583 A | | 5/1995 | Knecht |
| 5,488,413 A | * | 1/1996 | Elder et al. ............ 348/13 |
| 5,563,815 A | | 10/1996 | Jones |
| 5,819,036 A | * | 10/1998 | Adams et al. ......... 395/200.33 |
| 5,822,677 A | * | 10/1998 | Peyrovian ............ 455/5.1 |
| 5,854,703 A | * | 12/1998 | West, Jr. ............ 359/167 |
| 5,862,451 A | * | 1/1999 | Grau et al. ............ 455/5.1 |
| 5,864,748 A | * | 1/1999 | Dail ............ 455/5.1 |
| 5,878,325 A | * | 3/1999 | Dail ............ 455/5.1 |
| 5,969,836 A | * | 10/1999 | Foltzer ............ 359/114 |
| 6,147,786 A | * | 11/2000 | Pan ............ 359/124 |
| 6,317,234 B1 | * | 11/2001 | Quayle ............ 359/125 |

* cited by examiner

*Primary Examiner*—Andrew Faile
*Assistant Examiner*—Son P. Huynh
(74) *Attorney, Agent, or Firm*—Hubert J. Barnhardt III; Kenneth M. Massaroni; Shelley L. Couturier

(57) ABSTRACT

A cable television system (100) includes forward and reverse paths. Reverse path circuitry within an optical node (400) of the system (100) receives reverse analog electrical signals from subscriber equipment (140) and generates therefrom a multiplexed reverse digital optical signal. The reverse digital optical signal is transmitted over a fiber optic cable 420 to a cable television hub (430), the reverse path portion of which includes no active circuitry. The hub (430) multiplexes the reverse digital optical signal with other reverse digital optical signals from other nodes to generate one or more forwarded digital optical signals at a hub output, wherein generation of the one or more forwarded digital optical signals requires only passive devices in the reverse path of the hub (430). The hub (430) is coupled to headend equipment (460) by one or more fiber optic cables (445, 450), and the headend equipment (460) receives the one or more forwarded digital optical signals and recovers therefrom the reverse analog electrical signals provided to the optical node (400).

6 Claims, 3 Drawing Sheets

CABLE TELEVISION SYSTEM WITH DIGITAL REVERSE PATH ARCHITECTURE

FIELD OF THE INVENTION

This invention relates generally to communication systems, and more specifically to communication systems having two-way communication capability.

BACKGROUND OF THE INVENTION

Communication systems, such as cable television systems, typically include a headend section for receiving satellite signals and demodulating the signals to an intermediate frequency (IF) or baseband. The down converted signals are then modulated with radio frequency (RF) carriers and converted to an optical signal for transmission from the headend section over fiber optic cable. Optical transmitters are distributed throughout the cable system, such as at headends or hubs, for transmitting and/or forwarding optical signals, and optical receivers are provided in remote locations within the distribution system for receiving the optical signals and converting them to radio frequency (RF) signals that are further transmitted along branches of the system over coaxial cable rather than fiber optic cable. Taps are situated along the coaxial cable to tap off downstream (also referred to as "outbound" or "forward") cable signals to subscribers of the system.

Communications as described in the preceding paragraph are generally referred to as "forward" or "downstream" communications since the signals originate at a headend and travel downstream, or in a forward direction, throughout the system to system subscribers. Some communication systems, particular some cable television systems, also include reverse path communications, in which subscriber equipment, e.g., set top boxes, televisions, and modems, transmit signals upstream, or in a reverse direction, to a headend or hub for processing. Communications in both directions have typically been analog in format.

Various factors influence the ability to accurately transmit and receive optical signals within an analog cable television system. As the length of fiber optic cable within a system increases, for example, signal losses also increase, thereby causing signal quality degradation. Furthermore, temperature fluctuations, which cause variation in the optical modulation index of the optical transmitter, can result in variation of the radio frequency (RF) output level of the optical receiver. Signal distortions can be caused by non-linearities in the laser and photodiode of the optical transmitter. These problems can be magnified when reverse path signals from subscriber equipment are transmitted upstream and processed by the same system equipment, such as nodes, hubs, and headend equipment.

Although signal degradation problems can be mitigated by employing expensive techniques, e.g., decreasing fiber lengths between optical nodes or increasing the number of hubs and nodes within a system, such techniques may prohibitively increase costs to both subscribers and service providers. Thus, what is needed is a better way to provide reliable and accurate transmission of optical signals within a cable television system.

DETAILED DESCRIPTION OF A PREFERRED EMBODIMENT

Figure 1:
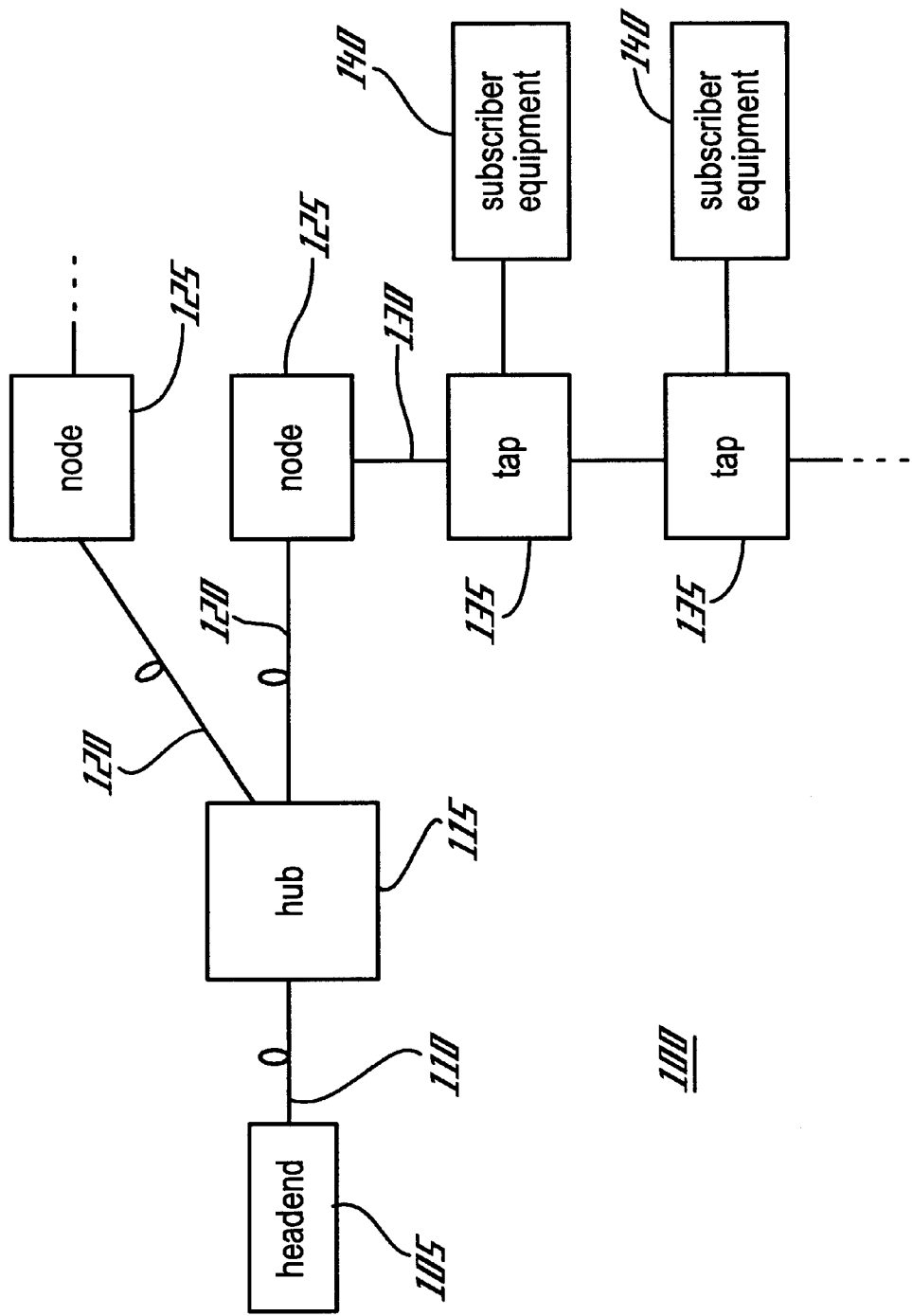
FIG. 1 is a block diagram of a conventional cable television system.

FIG. 1 shows a communications system, such as a cable television system 100 having both forward and reverse paths, i.e., having the ability to communicate downstream in the forward direction and upstream in the reverse direction. The cable television system 100 includes headend equipment 105 for receiving signals from various sources and processing and/or modulating them for delivery over the communications network 100. The signals are then converted to cable television signals that are routed throughout the system 100 to subscriber equipment 140, such as set top decoders, televisions, or computers, located in the residences or offices of system subscribers. The headend 105 can, for instance, convert a broadband radio frequency (RF) signal to an optical signal that is transmitted over fiber optic cable 110, in which case a remotely located optical hub 115 forwards the optical signal further throughout branches of the system 100 over additional fiber optic communication media 120. In the different branches of the system 100, one or more optical nodes 125 convert the forward optical signals to electrical radio frequency (RF) signals for transmission deeper into the system 100 over electrical communication media, such as coaxial cable 130. Taps 135 located along the cable 130 at various points in the distribution system split off portions of the RF signal for routing to subscriber equipment 140 coupled to subscriber drops provided at the taps 135.

The system 100, as mentioned, also has reverse transmission capability so that signals, such as data, video, or voice signals, generated by the subscriber equipment 140 can be provided back to the headend equipment 105 for processing. The reverse signals travel through the taps 135 and any nodes 125 and hubs 115 to the headend 105. In the configuration shown in FIG. 1, RF signals generated by the subscriber equipment 140 travel to the node 125, which converts the RF signals to optical signals for transmission over the fiber optic cable 120 through the hub 115 to the headend 105.

As reverse transmission equipment, such as computers, modems, televisions, and set top units, located in subscriber homes and offices becomes more prevalent, upstream traffic increases accordingly, resulting in the need for more efficient signal processing and more complex equipment in the reverse path of cable television systems.

Figure 2:
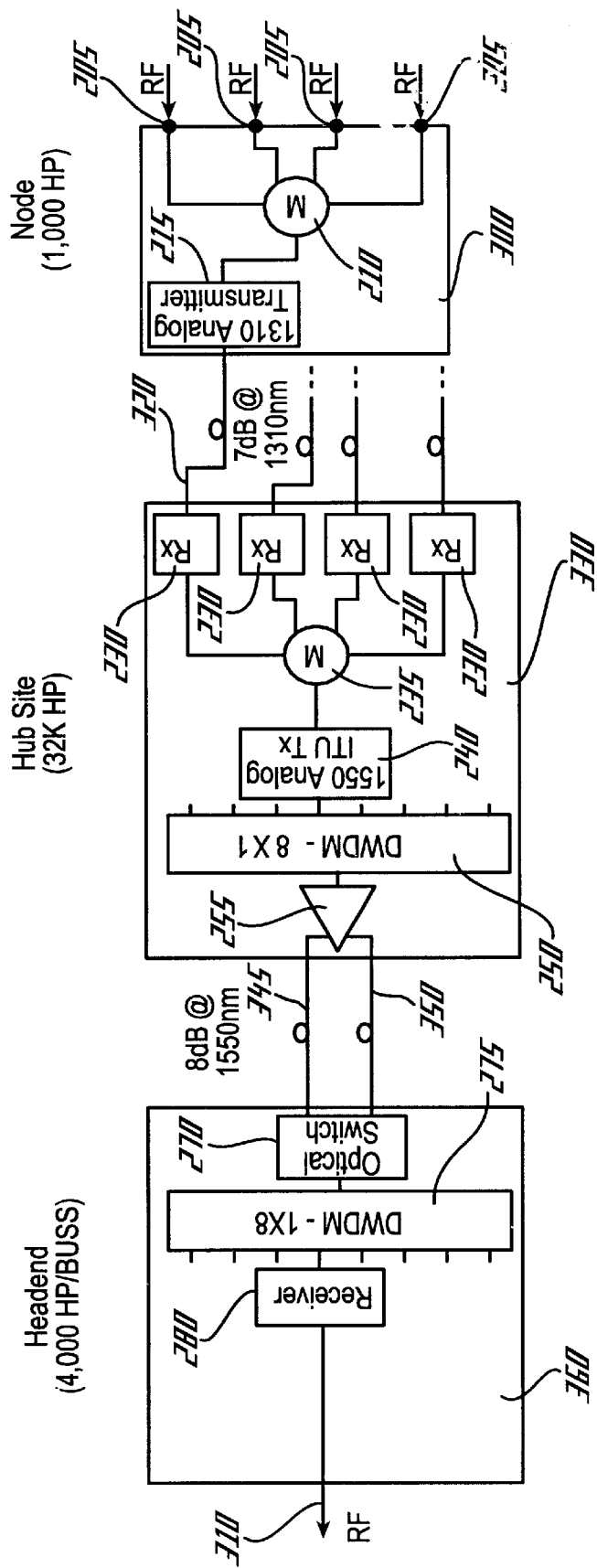
FIG. 2 is an electrical block diagram of conventional headend, hub, and node equipment for use in a cable television system.

FIG. 2 shows an analog reverse path scheme that has been employed in the reverse path of cable television systems, such as the system 100 of FIG. 1. In FIG. 2, the reverse path equipment portions of a node 300, a hub 330, and headend equipment 360 are depicted. The node 300 includes, for example, reverse path equipment for processing upstream signals generated at approximately 1,000 homes. More specifically, the node 300 includes four input ports 205 for receiving RF signals forwarded upstream by taps (not shown) within the system. The RF signals are provided to a signal summer 210 for combining the RF signals, and the summed analog RF signal is provided to an analog optical transmitter 215 for transmission, in a known manner, as an optical signal over a fiber optic communication channel 320. The optical signal can, for instance, be transmitted at 1310 nanometers (nm). An upstream hub 330 includes four receiver circuits 230, each one of which can process an incoming analog optical signal from a different node 300. Each receiver circuit 230 processes the received analog optical signal to recover the RF signal which was summed in the node 300 and subsequently provided to the node transmitter 215. The recovered RF signals from the four receiver circuits 230 are combined by a signal summer 235 within the hub 330 and then processed for transmission by an analog optical transmitter 240, which can, for example, transmit at 1550 nm. The output of the transmitter 240 is provided to an input of a eight-to-one dense wave division multiplexer (DWDM) 250, which can multiplex the optical signal together with other upstream optical signals. The multiplexed optical signal is then amplified by an optical amplifier/splitter 255 within the hub 330 for transmission over two different fiber optic cables 345, 350.

The four receiver circuits 230, the summer 235, and the analog transmitter 240 comprise only a single reverse circuit of the hub reverse path circuitry. It will be appreciated that seven other such reverse circuits can be included in the hub 330 for connection to the DWDM 250, which multiplexes eight incoming signals to provide a single output signal. As a result, the hub 330 can process reverse traffic from 32,000 homes.

According to the analog system architecture of FIG. 2, two fiber optic cables 345, 350 are coupled to inputs of reverse circuitry included within headend equipment 360. The reverse path of the headend equipment 360 includes an optical switch 270 for switching between the received analog optical signals, which are redundant, into a single signal that is coupled to the input of a one-to-eight DWDM 275 that demultiplexes the optical signal to generate eight optical outputs. Each of the eight output signals is provided to a receiver 280 (only one of which is shown) for recovering the RF signal and providing it at an output buss 310. The headend equipment 360 can, therefore, provide reverse signal traffic for up to 4,000 subscribers on each RF buss 310.

The reverse path architecture of FIG. 2 processes reverse path traffic for up to 32,000 subscribers by transmitting upstream signals in an analog format. Each hub within such architecture contains both forward and reverse circuitry associated with numerous optical nodes served by that hub, and the hubs serve as a collection point for return signals from each node.

Physically, a cable television hub may be included within a dedicated building or, more typically, within a small cabinet that may or may not be environmentally controlled and in which space is limited. Therefore, cable service providers understandably desire to limit the amount of circuitry that must be included within a hub.

An additional consideration is that cable television network reliability is of paramount importance, and increasing the number of active components in a device increases the likelihood of mechanical and electrical failure or malfunction. This is even more of a problem in devices, such as hubs, that may not be environmentally controlled, that serve a large number of cable television subscribers, and that may be located in physically distant regions. Security is also an issue, since conventional hubs are distant from a central office and are often located in areas, such as utility easements, that are easily accessible by vandals. For all of these reasons, reduction of complex circuitry at remote locations, such as within hubs and nodes of a cable television architecture, is desirable.

The analog architecture of FIG. 2 is less than ideal not only because of the amount of remotely located complex equipment in the reverse path, but also because the reverse transmissions occur in an analog environment. As a result, all of the problems that are associated with numerous analog transmissions over great distances (detailed in the Background of the Invention hereinabove) are present in the analog architecture of FIG. 2. Additionally, the architecture of FIG. 2 is bandwidth restrictive because approximately 4,000 homes share a single buss at multiple locations within the reverse path architecture. These problems are mitigated in the reverse path cable television architecture shown in FIG. 3.

Figure 3:
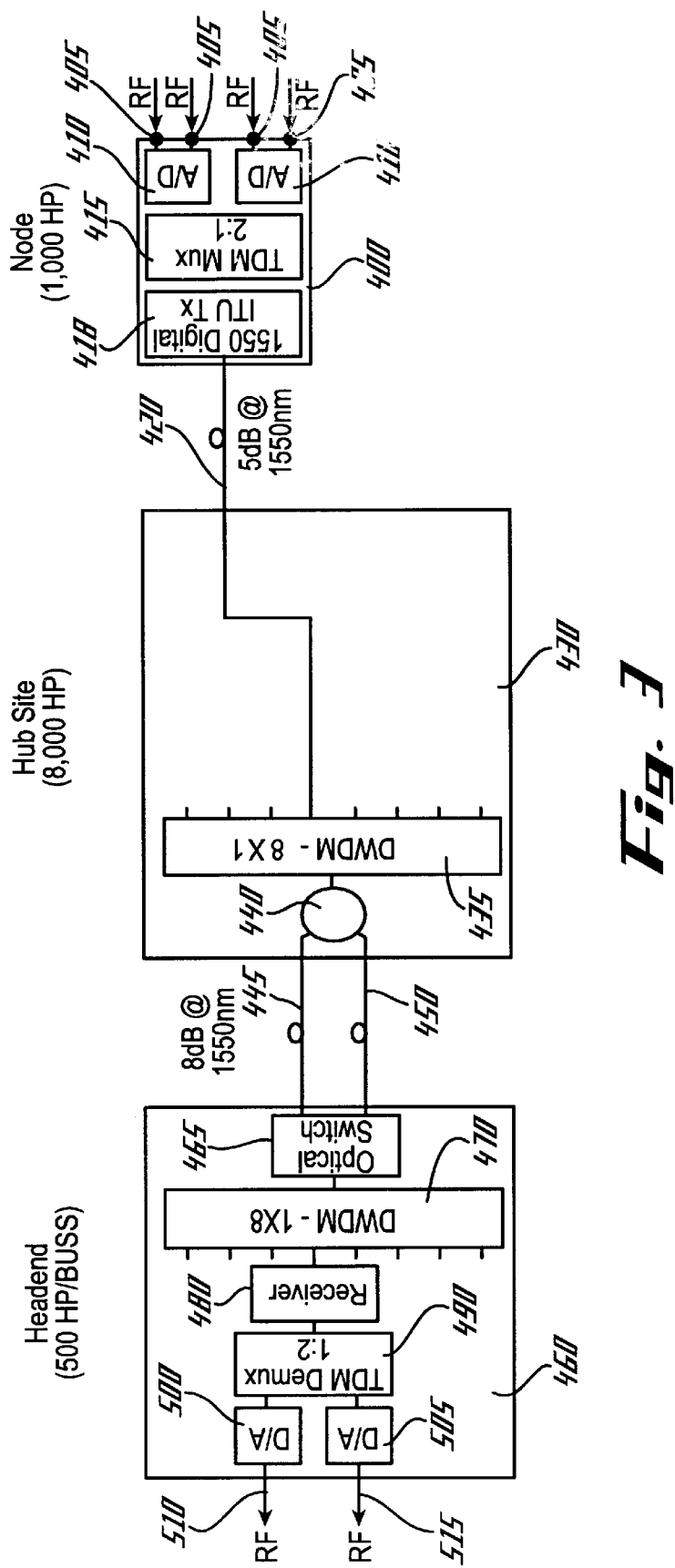
FIG. 3 is an electrical block diagram of headend, hub, and node equipment for use in a cable television system in accordance with the present invention.

FIG. 3 illustrates reverse path circuitry included in cable television nodes, hubs, and headend equipment of a cable television system in accordance with the present invention. As shown, an optical node 400 includes a reverse path circuit comprising four analog RF input ports 405 for receiving reverse transmissions from subscriber equipment. The node 400 further includes two or more analog-to-digital (A/D) converters 410, each of which is coupled to two input ports 405 for receiving two RF signals which are combined (either inside or outside of the A/D converter 410) prior to digital conversion. In this manner, RF signals can be received by the node 400 from approximately 1,000 subscribers.

Each A/D converter 410 converts the combined analog electrical signals to a single digital electrical signal that is provided to an input of an N-to-one time division multiplexer 415, where N can, for example, equal two (2). The multiplexer 415 interleaves the incoming digital electrical signals, such as by bits, bytes, or data packets, to provide a single digital bit stream which is digitally optically transmitted by an optical transmitter 418, which can, for instance, transmit over a fiber optic cable 420 at 1550 nm.

Digital optical transmitters and receivers are disclosed in detail in commonly assigned U.S. patent application Ser. No. 09/102,344 (Attorney's Docket No. A-4749) to Farhan et al., entitled "Digital Optical Transmitter" and filed on Jun. 22, 1998, the teachings of which are hereby incorporated by reference.

The digital optical signal is received by reverse path circuitry included in the hub 430 and routed directly to an input of an N-to-one DWDM 435, where N can be eight (8). When N=8, the DWDM 435 can also receive seven other digital optical signals from seven other nodes so that the hub 430 is capable of processing reverse signals from a total of 8,000 subscribers. The DWDM 435 multiplexes the signals to generate a single digital optical output, which can optionally be split by a passive optical splitter 440 into two signals, each of which is transported over a different fiber optic cable 445, 450 for redundancy. Diversity within the system is not, however, necessary.

When redundancy is provided, the two fiber optic cables 445, 450 are coupled to reverse path inputs of headend equipment 460. The headend equipment 460 includes an optical switch 465 that switches between the two received digital optical signals into a single digital optical signal that is coupled to the input of a one-to-N DWDM 470, where N can be equal to eight (8). When N=8, the DWDM 470 demultiplexes the digital optical signal to generate eight digital optical signals at its eight outputs. Each output of the DWDM 470 is coupled to a receiver 480 (only one of which is shown) for converting the digital optical signal to a digital electrical signal and then to a time division demultiplexer 490 for splitting the electrical signal into two digital electrical signals that are equivalent to the two digital electrical signals that were previously generated by the A/D converters 410 of the node 400. Each demultiplexed signal is provided to a digital-to-analog (D/A) converter 500, which converts the digital electrical signal to an analog electrical signal for transmission over an RF buss 510, 515.

It will be appreciated that the headend equipment 460 can include a receiver, demultiplexer, and two D/A converters for each of the eight DWDM outputs and that, according to the circuitry depicted in FIG. 3, each RF output buss 510, 515 can provide reverse path transmissions from 500 homes, or subscribers.

It will be appreciated by one or ordinary skill in the art that the reverse path architecture of FIG. 3 can, according to the present invention, be configured to use different numbers of elements and different types of elements without departing from the teachings herein. For example, the node 400 could include different numbers of A/D converters 410, and the time division multiplexing need not be two-to-one. Additionally, the DWDMs 435, 470 could process various numbers of signals, and diversity could be entirely lacking in the reverse path architecture between the hub 430 and the headend 460. Alternatively, a greater number of diverse paths could be employed, if desired. It will be further appreciated that variations within the reverse path architecture of the present invention could dictate that the nodes 400, hubs 430, and headend equipment 460 process signals from a greater number or a lesser number of subscriber homes without impacting the advantages of the reverse path architecture described herein.

In summary, according to the present invention, a fiber link digital reverse architecture is employed in conjunction with time division multiplexing to transport multiple reverse bands from an optical node through a simplified hub back to the headend equipment, and the hub can become totally passive in the reverse path. As a result, the hub is less likely to malfunction and its components can be physically arranged within a smaller space. The hub, consequently, can be mounted within a smaller housing that could be aerially mounted so that it is less accessible, which decreases security concerns. It can be seen that the reverse path architecture of the present invention eliminates active reverse electronics in hub sites and significantly reduces the number of node transmitters and headend receivers. In the depicted embodiments, the node transmitters and headend receivers are reduced by a factor of four when compared to the analog approach of FIG. 2. Still other advantages are that, since reverse path signals are not received, processed, and retransmitted within the hub, the signal quality is not unnecessarily degraded by such processing and retransmission and, since reverse signals from only 500 homes are processed on each reverse buss, bandwidth is not unnecessarily restricted.

What is claimed is:

1. In a cable television (CATV) system including a headend that provides video and data to a plurality of subscriber equipment via a hybrid fiber/coax (HFC) network that includes a fiber portion, a coax portion, and a node for connecting the fiber portion to the coax portion, a reverse path of the HFC network including a digital optical node, a hub, and a headend, the reverse path comprising:

in the digital optical node,
a plurality of inputs for receiving from the coax portion of the HFC network a combined reverse analog RF signal comprising RF reverse path signals from the plurality of subscriber equipment;
a plurality of analog-to-digital (A/D) converters each coupled to an input for converting the combined reverse analog RF signal into a reverse digital signal;
a multiplexer for multiplexing the reverse digital signals from the plurality of A/D converters into a single multiplexed digital stream; and
a digital optical transmitter for generating a reverse digital optical signal in accordance with the single multiplexed digital stream; and in the headend,
a receiver for recovering a digital electrical signal from the reverse digital optical signal;
a demultiplexer for demultiplexing the digital electrical signal to generate demultiplexed signals; and
a plurality of digital-to-analog (D/A) converters for converting the demultiplexed signal to the combined reverse analog RF signal.

2. The CATV system of claim 1, wherein the combined reverse analog RF signal includes video, audio, and data signals.

3. The CATV system of claim 1, further comprising:
in the hub,
a dense wave division multiplexer (DWDM) for multiplexing the single multiplexed digital stream with other single multiplexed digital streams from other digital optical nodes to generate one or more forwarded digital optical signals at a hub output, wherein generation of the one or more digital optical signals in the reverse path.

4. The CATV system of claim 3, wherein the headend further comprises:
a dense wave division demultiplexer for demultiplexing the one or more digital optical signals and for providing the demultiplexed signals to the receiver.

5. The CATV system of claim 1, wherein the digital optical transmitter transmits the reverse digital optical signal at a single wavelength.

6. The CATV system of claim 1, wherein the reverse path further comprises:
in the hub,
an optical splitter for splitting the reverse digital optical signal into two reverse digital optical signals; and
in the headend,
an optical switch for receiving the two reverse digital optical signals and generating therefrom a single reverse digital optical signal.

* * * * *

UNITED STATES PATENT AND TRADEMARK OFFICE
CERTIFICATE OF CORRECTION

PATENT NO.    : 6,523,177 B1
DATED         : February 18, 2003
INVENTOR(S)   : Brown et al.

It is certified that error appears in the above-identified patent and that said Letters Patent is hereby corrected as shown below:

<u>Title page</u>,
Item [75], Inventors, please correct the names of the inventors to read as follows:
-- Douglas E. Brown, Lawrenceville, GA (US); Fariborz M. Farhan, Alpharetta, GA (US) --

<u>Column 6</u>,
Line 9, delete "(AID)" and insert therefore -- (A/D) --

Signed and Sealed this

Fourth Day of November, 2003

JAMES E. ROGAN
*Director of the United States Patent and Trademark Office*